United States Patent
Weksler et al.

(10) Patent No.: US 10,282,082 B2
(45) Date of Patent: May 7, 2019

(54) ALTERING PRESENTATION OF AN ELEMENT PRESENTED ON A DEVICE BASED ON INPUT FROM A MOTION SENSOR

(71) Applicant: LENOVO (SINGAPORE) PTE. LTD., New Tech Park (SG)

(72) Inventors: Arnold S. Weksler, Raleigh, NC (US); Russell Speight Vanblon, Raleigh, NC (US); John Carl Mese, Cary, NC (US); Nathan J. Peterson, Durham, NC (US)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 828 days.

(21) Appl. No.: 14/270,807

(22) Filed: May 6, 2014

(65) Prior Publication Data

US 2015/0324115 A1    Nov. 12, 2015

(51) Int. Cl.
*G06F 3/0488* (2013.01)
*G06F 3/041* (2006.01)
*G06F 3/0346* (2013.01)
*G06F 3/0484* (2013.01)

(52) U.S. Cl.
CPC .......... *G06F 3/0488* (2013.01); *G06F 3/0346* (2013.01); *G06F 3/0412* (2013.01); *G06F 3/0484* (2013.01); *G06F 3/04886* (2013.01); *G06F 2203/04101* (2013.01); *G06F 2203/04803* (2013.01)

(58) Field of Classification Search
CPC combination set(s) only.
See application file for complete search history.

(56) References Cited

U.S. PATENT DOCUMENTS

| | | | |
|---|---|---|---|
| 9,244,604 B1* | 1/2016 | Lewbel | G06F 3/0488 |
| 2010/0241983 A1* | 9/2010 | Walline | G06F 1/1626 |
| | | | 715/773 |
| 2011/0007004 A1* | 1/2011 | Huang | G06F 3/0237 |
| | | | 345/173 |
| 2014/0247218 A1* | 9/2014 | Walton | G06F 3/04886 |
| | | | 345/168 |

* cited by examiner

*Primary Examiner* — Robin J Mishler
(74) *Attorney, Agent, or Firm* — John M. Rogitz; John L. Rogitz

(57) ABSTRACT

In one aspect, a device includes a touch-enabled display, an accelerometer, a processor, and a memory accessible to the processor. The memory bears instructions executable by the processor to present, on the touch-enabled display, a keyboard in a first configuration and to receive at least one signal from the accelerometer. The instructions are also executable to present the keyboard in a second configuration different from the first configuration at least in part in response to receipt of the signal.

10 Claims, 6 Drawing Sheets

ALTERING PRESENTATION OF AN ELEMENT PRESENTED ON A DEVICE BASED ON INPUT FROM A MOTION SENSOR

I. FIELD

The present application relates generally to altering presentation of an element presented on a display of a device based on input from a motion sensor.

II. BACKGROUND

Users often attempt to manipulate a device such as e.g. a smart phone when moving such as when e.g. traveling in a vehicle or walking down the street. Owing to such motion, accurately entering input to the device as intended becomes more difficult than when still.

SUMMARY

Accordingly, in one aspect a device includes a touch-enabled display, an accelerometer, a processor, and a memory accessible to the processor. The memory bears instructions executable by the processor to present, on the touch-enabled display, a keyboard in a first configuration and to receive at least one signal from the accelerometer. The instructions are also executable to present the keyboard in a second configuration different from the first configuration at least in part in response to receipt of the signal.

In another aspect, a method includes receiving input at a device from a motion sensor in communication with the device and adjusting presentation of an element presented on a display of the device from a first position to a second position at least in part based on the input.

In still another aspect, a device includes a first processor, a network adapter, and storage bearing instructions executable by a second processor for processing input from a motion sensing element in communication with the second processor. The storage also bears instructions for execution by a second processor for altering the location of an element presented on a display at least in part based on the input, where the display is in communication with the second processor. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
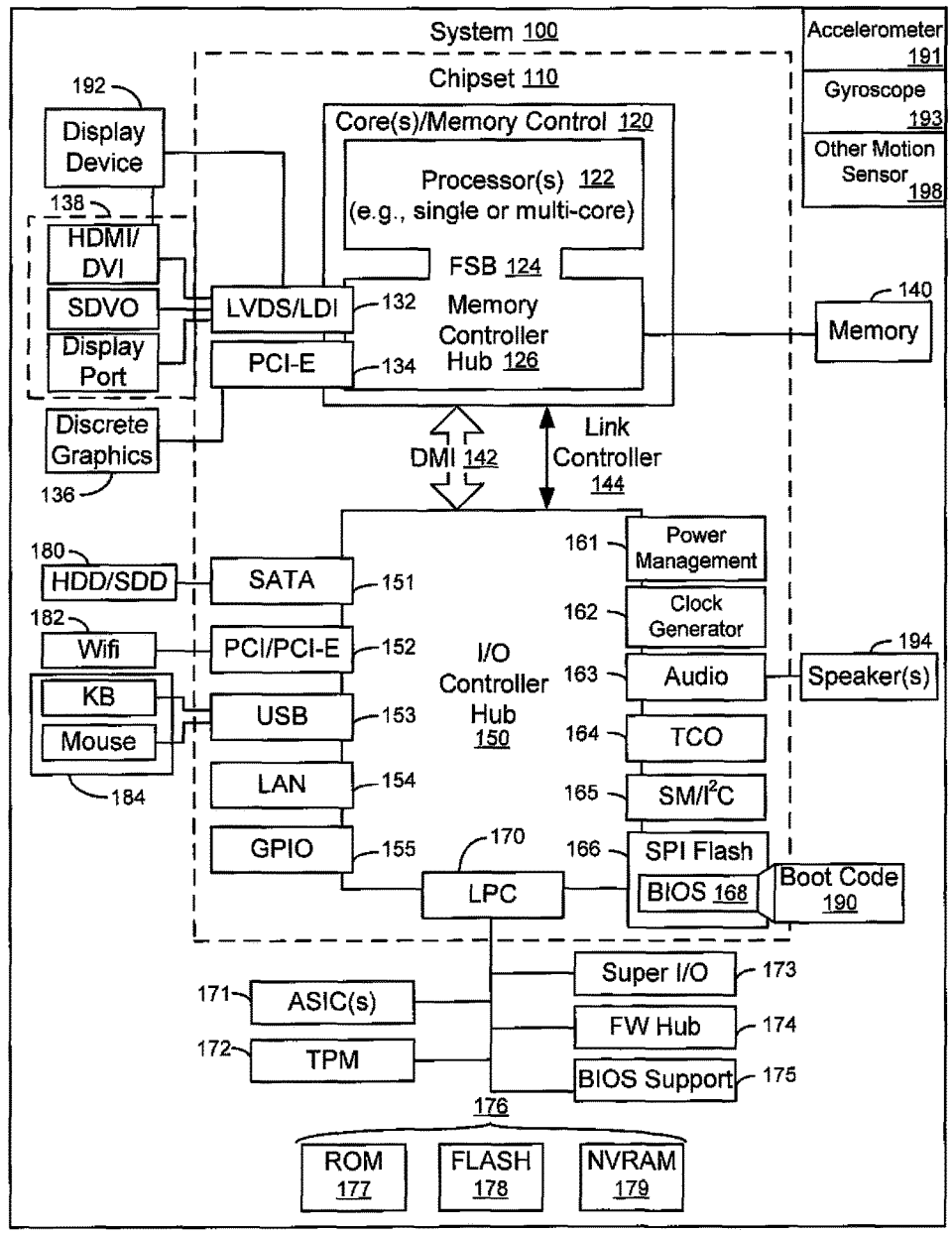
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 is understood to include an audio receiver/microphone 195 in communication with the processor 122 and providing input thereto based on e.g. a user providing audible input to the microphone 195. A camera 196 is also shown, which is in communication with and provides input to the processor 122. The camera 196 may be, e.g., a thermal imaging camera, a digital camera such as a webcam, and/or a camera integrated into the system 100 and controllable by the processor 122 to gather pictures/images and/or video.

Still in reference to FIG. 1, an accelerometer 191 for e.g. sensing acceleration and/or movement of the system 100 is shown, along with a gyroscope 193 for e.g. sensing and/or measuring motion and/or the orientation of the system 100 and another motion sensor 198 that is also for sensing motion of the system 100. In addition to the foregoing, FIG. 1 shows a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
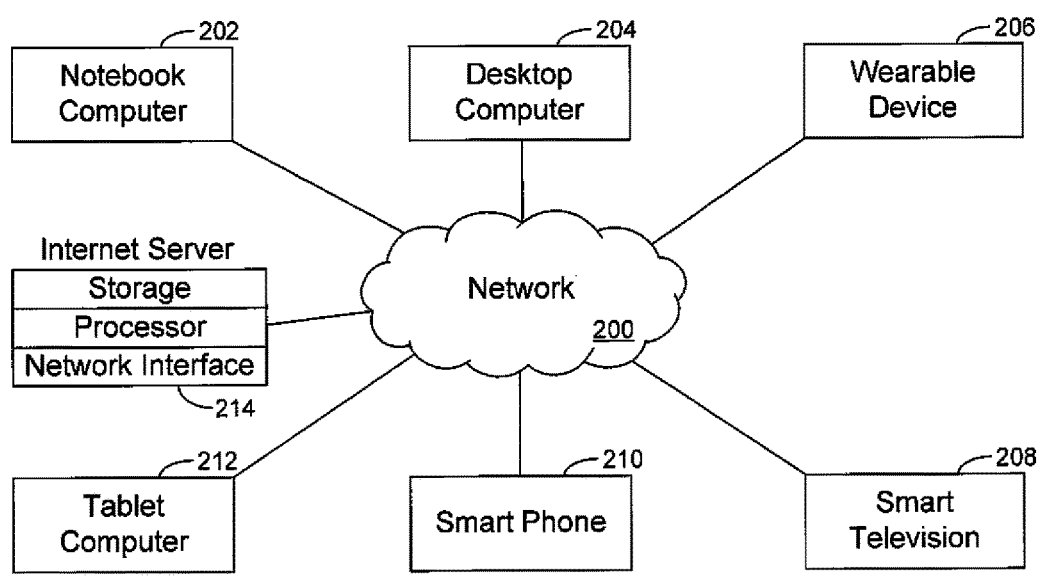
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
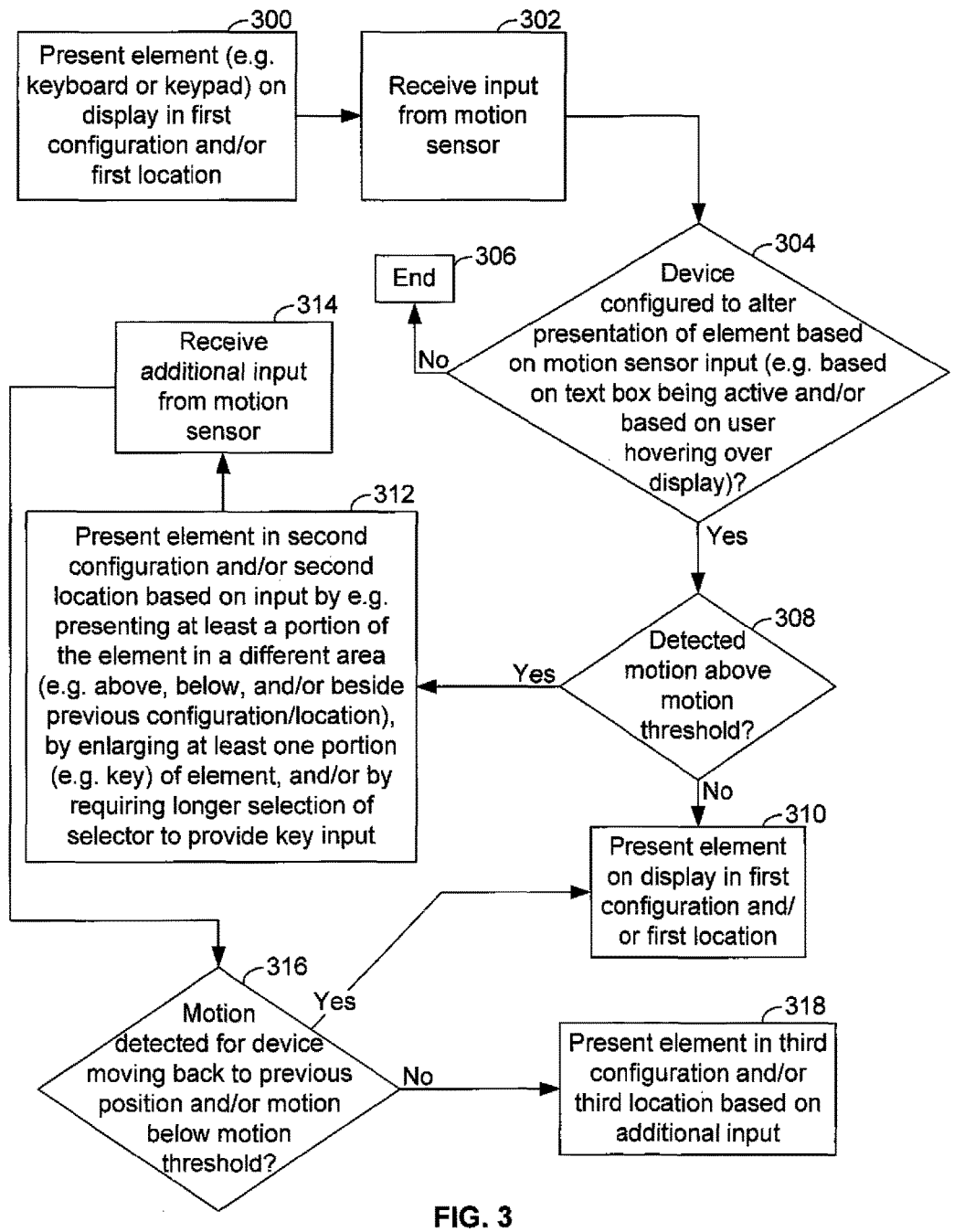
FIG. 3 is a flow chart showing an example algorithm in accordance with present principles.

Referring to FIG. 3, it shows example logic that may be undertaken by a device such as the system 100 in accordance with present principles. Beginning at block 300, the logic presents an element such as e.g. a keyboard, a keypad, and/or another user input area (e.g. a cancel selector element or an acknowledgement selector element (e.g. "okay" selector element)) on a display of the device undertaking the present logic (referred to below as the "present device"). The element is presented on the display in a first configuration and/or at a first location, it being understood that in some embodiments such a configuration may include element location in addition to e.g. functionality of the element at the location. In any case, from block 300 the logic proceeds to block 302, where the logic receives input from a motion sensor such as e.g. an accelerometer and/or a gyroscope.

From block 302 the logic proceeds to decision diamond 304 where the logic determines whether the present device has been configured to alter presentation of the element based on motion sensor input. The determination at diamond 304 may be executed by e.g. accessing settings for the present device that may have been configured e.g. using a user interface (UI) such as the UI 1000 to be described below in reference to FIG. 10. Also, the determination at diamond 304 may be to determine whether the present device has been configured to alter presentation of the element based on motion sensor input specifically when e.g. a text box presented on the display is active, and/or when a user has been detected as hovering a portion of the user over the display, as will be described further below.

A negative determination at diamond 304 causes the logic to proceed to block 306, at which the logic may end. However, an affirmative determination at diamond 304 instead causes the logic to proceed to decision diamond 308, at which the logic determines whether the motion detected by the motion sensor is above a motion threshold. A negative determination at diamond 308 causes the logic to proceed to block 310, where the logic presents (e.g. continues to present) the element on the display in the first configuration and/or first location. However, an affirmative determination at diamond 308 instead causes the logic to move to block 312. However, before describing block 312, it is to be understood that e.g. the determination made at diamond 308 may be made in some embodiments where e.g. the present device has been configured to not change the configuration and/or location of the element when only a relatively small amount of movement is detected e.g. below the movement threshold. The amount of movement for the threshold may be preset by the present device's manufacturer, and/or may be set by a user based on input to a UI such as the UI 1000 to be described further below.

Now describing block 312, at this block the logic presents the element in a second configuration and/or a second location based on the input from the motion sensor. The element may be presented in the second configuration and/or second location by presenting it according to one or more of the following: by presenting the element in a different area of the display (e.g. above, below, and/or beside the element's previous configuration and/or location), by enlarging at least one portion of the element such as enlarging one or more keys when the element is a keyboard or keypad, and/or by requiring selection of a selector of the element for a longer (e.g. threshold) time than would otherwise be required (e.g. a shorter threshold time) when the present device is not (e.g. currently) undergoing motion and/or a change in orientation.

After block 312, the logic proceeds to block 314 where the logic may receive additional input from the motion sensor. From block 314 the logic proceeds to decision diamond 316 where the logic determines whether motion for the present device as detected by the motion sensor is indicative of the present device returning to the previous position e.g. at which it was disposed prior to generation of the input described in reference to block 302. In addition to or in lieu of the foregoing but also at diamond 316, the logic may determine whether the additional motion is below a motion threshold such as the threshold described above in reference to diamond 308.

An affirmative determination at diamond 316 causes the logic to proceed back to block 310 where the logic presents the element on the present device's display ion the first configuration and/or first location. Note that in some embodiments, e.g. the logic may revert back to block 310 even if the present device has not returned to the previous position at which it was disposed when device motion is nonetheless determined to be below the motion threshold, and thus the element may be presented at its previous position on the display based on motion of the present device having at least relatively stabilized (e.g., relative to bodies of mass around the present device and/or acting on the present device, such as a vehicle in which the present device is disposed and/or a person holding the present device) and/or ceased.

Still in reference to FIG. 3, note that a negative determination at diamond 316 causes the logic to proceed to block 318 rather than block 310. At block 318 the logic presents the element in a third configuration and/or third location based on the additional input received at block 314, where the third configuration and/or third location are different respectively from both the first configuration and/or first location, and the second configuration and/or second location.

Figure 4:
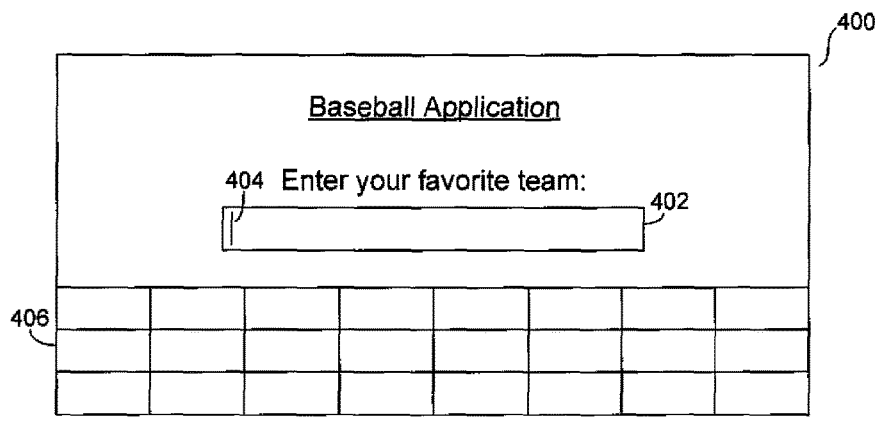
FIG. 4-10 are example user interfaces (UI) in accordance with present principles.
Figure 5:
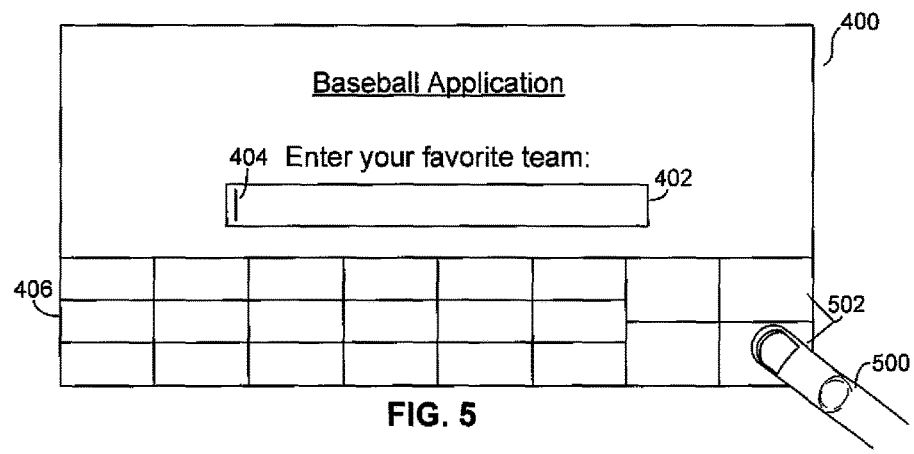

Continuing the detailed description in reference to FIGS. 4 and 5, a user interface (UI) 400 is shown. The UI 400 includes a text entry box 402 which in the present instance is active e.g. as indicated by the cursor 404 in that e.g. selection of a key from the (e.g. "soft" and/or "virtual") keyboard 406 will automatically and without further user input to the device cause a character associated with the key to be entered to the box 402 and processed accordingly as input to the device.

As may be appreciated from FIG. 5, a portion 500 of a user has been sensed by the device as hovering and/or being in proximity to the display presenting the UI 400 (e.g. by the touch-enabled display using e.g. hover sensing software and technology, and/or change in display capacitance principles), and accordingly the keyboard has been altered from the first configuration shown in FIG. 4 to the second configuration shown in FIG. 5. Thus, the second configuration of FIG. 5 shows at least one enlarged key 502 and optionally plural enlarged keys e.g. that were previously disposed on the display at least partially under the portion 500 as sensed by the device prior to enlarging the at least one key 502 and/or that were within a threshold distance (e.g. lateral display distance) from the portion 500. It may be appreciated from FIG. 5 that the key 502 is enlarged relative to its presentation in the first configuration to make it relatively easier for a user to select the key when the user and/or device are undergoing movement e.g. relative to each other.

Now in reference to FIGS. 6-9, a UI 600 including a keypad 602 of at least some numerical keys is shown. The UI 600 also includes a text entry box 604 with an active cursor 606 indicating that the box 604 is active. As may be appreciated from FIG. 6, the keypad 602 is in an initial and/or default configuration (e.g. location and/or position) as presented on the UI 600, and/or a configuration (e.g. location and/or position) when the device is not sensing any change motion and/or when such motion is below a motion threshold.

Figure 7:
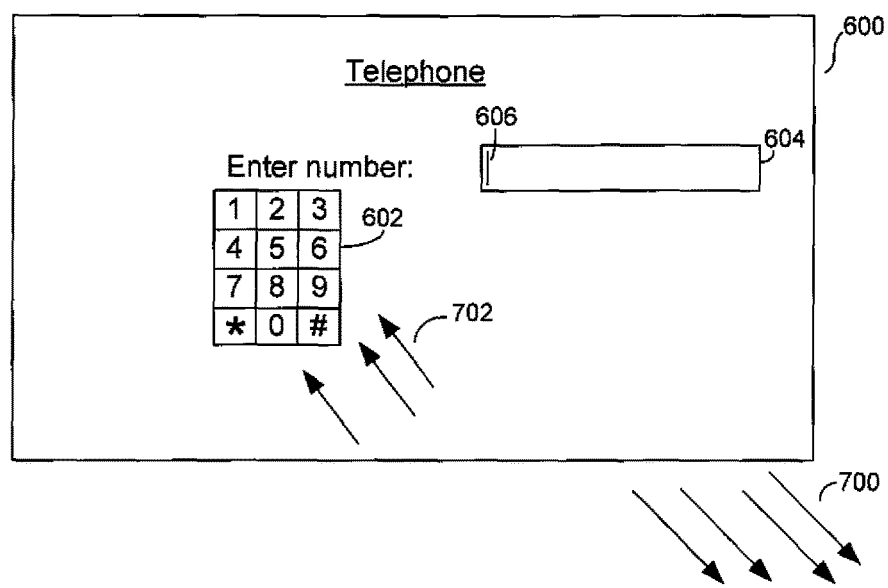

In any case, as may be appreciated from FIG. 7, once motion is detected, the device may in response thereto alter the location of the keypad 602 on the UI 600 as shown. FIG. 7 also shows arrows 700 which indicate a direction of motion in e.g. at least two dimensions and/or e.g. a direction of motion along a plane established by the display of the device and/or a plane at least substantially parallel to the display. In any case, the foregoing may be determined by the device e.g. based on input from a motion sensor of the device sensing the motion in the direction indicated by the arrows 700.

Figure 6:
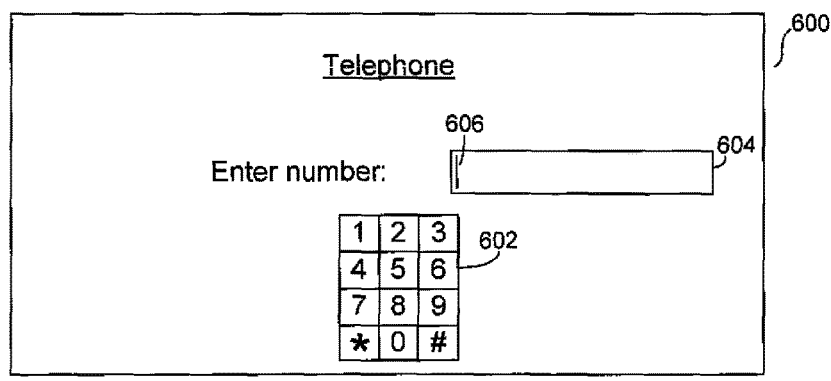

FIG. 7 also shows arrows 702 which are understood correspond to the direction of movement and/or alteration of the keypad 602 from its first configuration as shown in FIG. 6 to its second configuration as shown in FIG. 7. Furthermore, as may be appreciated from FIG. 7, the arrows 702 are (e.g. at least along the plane established by the display) oriented in a direction at least substantially opposite the direction indicated by the arrows 700. Note that the arrows 702 (as well as the arrows 802 and 900 to be described below) are understood to not necessarily be presented on the UI 600 but are shown in the figures to indicate the direction of movement of the keypad 602, though it is to be understood that in other embodiments these arrows may indeed be presented on the UI as the keypad 602 changes location.

Figure 8:
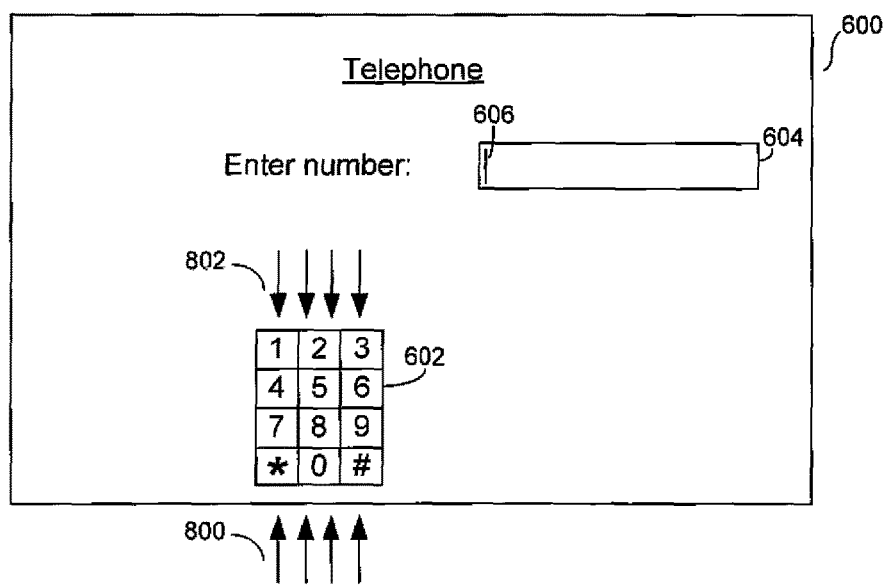

Now in reference to FIG. 8, it is to be understood that the device presenting the UI 600 may continue to move and/or undergo a change in motion as sensed by a motion sensing element of the device after the movement indicated by the example arrows 700 and without e.g. the amount of movement at at least some point in time during the movement going below a movement threshold and/or without the movement ceasing e.g. for at least a threshold time. In such situations, the location of the keypad 602 may continue to be altered (e.g. without its reverting to its initial and/or default position or location), such as from the second configuration shown in FIG. 7 to a third configuration as shown in FIG. 8. Thus, arrows 800 indicate a direction of motion of the device e.g. in two dimensions and/or along a plane established by the display of the device. Arrows 802 are also shown and are understood to correspond to the direction of movement and/or alteration of the keypad 602 from the second configuration as shown in FIG. 7 to the third configuration as shown in FIG. 8. Also, note that the arrows 802 are directed in at least substantially the opposite direction as the arrows 800 to thus indicate that the keypad 602 undergoes an alteration of its position in a direction at least substantially opposite the motion of the device.

Figure 9:
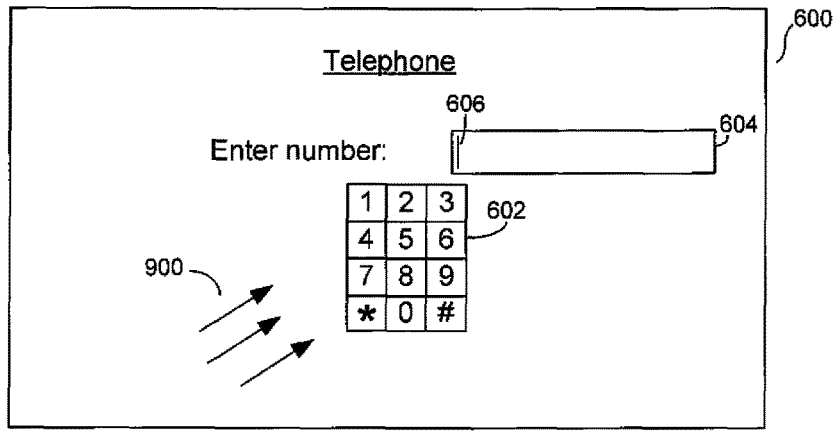

Describing FIG. 9, it shows the keypad 602 returning to its first configuration in a direction from the third configuration as indicated by the arrows 900. The device may alter presentation of the keypad 602 to return to the first configuration automatically responsive to e.g. the device itself returning to the position it was at as determined based on input from the motion sensing element of the device and/or also e.g. position (e.g. GPS) coordinates for the device received from a position transceiver on the device. Return to the first configuration may also occur responsive to determining that e.g. an amount of movement the device is currently undergoing is below a movement threshold as disclosed herein and/or determining that movement of the device has ceased, albeit not at the previous (e.g. initial) position for the device described in reference to FIG. 6 specifically but at a different device position.

Figure 10:
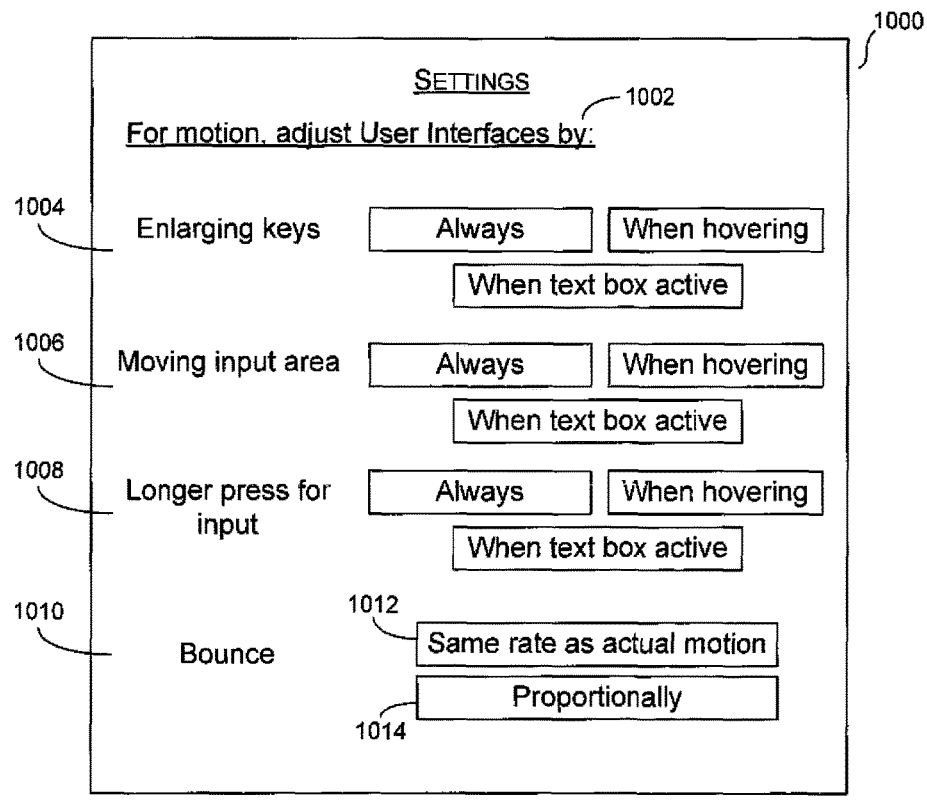

Before moving on to the description of FIG. 10, and as may be appreciated from FIGS. 6-9, it is to be understood that not all selectors and/or other elements presented on the UI 600 are altered in their configuration and/or positioning on the UI 600 as the device undergoes movement as described in reference to these figures. Instead, (e.g. only) the keypad 602 and/or any other active elements move from one configuration to another based on the movement. Thus, as may be appreciated from FIGS. 6-9, the configuration and/or location of the box 604 has not changed in these figures as the device senses movement even though the configuration of the keypad 602 changes based on the same movement.

Continuing the detailed description in reference to FIG. 10, it shows an example settings UI 1000 for configuring settings of a device for altering configurations of keypads, keyboards, and/or other selectors and elements when presented on the device in accordance with present principles. Thus, the UI 1000 includes an indication 1002 that the settings beneath the indication 1002 are for adjusting presentation of a UI presented on the device based on motion that is sensed by the device.

As may be appreciated from FIG. 10, each of a first setting 1004, second setting 1006, and third setting 1008 are shown. The first setting 1004 pertains to whether to enlarge at least one key of e.g. a keyboard or keypad (and/or another area of a UI in accordance with present principles such as e.g. an area and/or other selector that is active) when motion is sensed in accordance with present principles. The second setting 1006 pertains to whether to move and/or alter the location of an input area such as a keyboard or keypad when motion is sensed in accordance with present principles. The third setting 1008 pertains to whether to alter the configuration of and/or response to input to e.g. a keyboard or keypad by e.g. requiring a relatively longer e.g. uninterrupted input to a key on the keyboard or keypad and/or longer unbroken contact with the portion of the display presenting the key in accordance with present principles. The relatively longer time may be e.g. a first threshold time longer than a second threshold time for providing input that e.g. should otherwise be met when the setting 1008 is not set to active and/or when no motion of the device is detected.

Furthermore, as may be appreciated from the UI 1000, each of the settings 1004, 1006, and 1008 may have three respective selector elements associated therewith for configuring the respective setting. The three respective selector elements for each of the settings 1004, 1006, and 1008 include a selector element for configuring the device to always perform the function associated with the respective setting and/or alter configuration of the UI per the respective setting (labeled in the example UI 1000 as "always" on each of the respective selector elements), a selector element for configuring the device to perform the function associated with the respective setting and/or alter configuration of the UI associated with respective setting in response to a determination that at least a portion of a user is in proximity to and/or hovering e.g. a threshold distance above the display of the device (labeled in the example UI 1000 as "when hovering" on each of the respective selector elements), and a selector element for configuring the device to perform the function associated with the respective setting and/or alter configuration of the UI associated with respective setting when and/or in response to a text box being active in accordance with present principles (labeled in the example UI 1000 as "when text box active" on each of the respective selector elements). Furthermore, note that each of the selector elements for each of the settings 1004, 1006, and 1008 are selectable to automatically without further user input responsive thereto configure the respective setting and hence the device accordingly.

Still in reference to the settings UI 1000, it also includes another setting 1010 pertaining to the rate at which e.g. a keyboard or keypad moves as presented on a display e.g. in response to detection of motion of the device. This rate of movement may in one respect be a "bounce" rate in that the keyboard or keypad appears to "bounce" around the display in directions opposite e.g. directions of device movement.

In any case, it is to also be understood that the rate of movement of the device may e.g. change over time based on changes in the velocity and/or acceleration of the device as it moves, and that these changes in rates may be reflected by a changing rate of movement of e.g. a keyboard presented on the display do the device. Even further, it is to be understood that a keyboard and/or keypad being presented may move at least substantially continually on the display as movement continues to be sensed and thus in some embodiments the presentation of the keyboard or keypad at any given location on the display may not be in at least this respect static and/or stationary in that the display may present the transition of the keyboard or keypad to a new configuration from a previous one rather than simply removing the keyboard or keypad from a previous location and presenting it at another location.

Furthermore, it is to be understood that in some embodiments a rate of movement of the keyboard and/or keypad may correspond directly to (e.g. be the same as) the rate of movement of the device itself such that e.g. the keyboard and/or keypad moves on the display to another location at the same rate sensed by e.g. an accelerometer on the device sensing the movement of the device. Notwithstanding, in other embodiments the rate of movement of the keyboard and/or keypad may be proportional to the actual rate of movement of the device (e.g. based on a default and/or user-defined ratio of actual movement of the device to movement of the keyboard or keypad). Thus, a selector element 1012 is shown in FIG. 10 for the setting 1010 for configuring the device to move the keyboard or keypad on the display per movement of the device at the same rate as actual movement of the device. A selector element 1014 is also shown for the setting 1010 for configuring the device to move the keyboard or keypad on the display per movement of the device proportionally to actual movement of the device.

Without reference to any particular figure, it is to be understood that although e.g. a keyboard or keypad may change configurations and/or locations based on movement of the device presenting the keyboard or keypad, the quantity of movement of the device may be such that e.g. corresponding movement and/or relocation of the keyboard or keypad per the device's movement may otherwise cause the keyboard or keypad to appear to "slide" or otherwise disappear off screen in a direction at least substantially opposite movement of the device. For such instances, the device may be configured (e.g. as a default setting and/or based on user input) to either disappear off screen accordingly, and/or the device may be configured (e.g. as a default setting and/or based on user input) to present the keyboard and/or keypad at or around the area of the display on which the keyboard or keypad would otherwise appear to slide off screen but instead still be presented (e.g. in its entirety) on the display with at least a portion of the keyboard or keypad e.g. abutting the area.

More specifically, when the device is configured to not "slide" the keyboard or keypad off screen, at least a portion of the boundary of the keyboard or keypad may abut an edge of the display (e.g. or at least an edge of the portion of the display configured to present images, information, etc.) at the display location at which the keyboard or keypad would otherwise appear to slide off screen. Even further, the device may be configured to, when presenting the keyboard and/or keypad as abutting a portion of the display in such instances, e.g. cause the keyboard and/or keypad to appear to bounce at least once (e.g. and even continually bounce or oscillate back and forth) off the abutting edge of the display (e.g. a threshold distance) and then return to abut the edge to indicate that e.g. the device continues to undergo such movement.

Still without reference to any particular figure, it is to be understood that movement of the device e.g. in all three dimensions may be detected by the device and reflected by the configuration, location, and/or movement of the keyboard, keypad, or other user interface element by not only e.g. moving the keyboard up and down and side to side on the device's display, but also by e.g. enlarging or shrinking the entire representation of the keyboard and/or keypad to indicate a respective opposite movement of the device in the third dimension. E.g., a keyboard may be enlarged as presented on the display when movement of the device is away from a user and the keyboard may be shrunk as presented on the display when movement of the device is toward the user. Thus, in addition to the other user sensing methods disclosed herein (e.g. sensing a "hover"), it is to be understood that signals from a camera on the device may be used to determine the location of a user at least for such purposes.

It may now be appreciated based on the present application that e.g. a keyboard or keypad may remain relatively more under a user's finger and/or at the same position relative to the user than it otherwise would even if the rest of the device does not remain at the same position owing to movement of the device relative to the user.

It may also be appreciated that a device in accordance with present principles may sense when it is moving and adjust the keyboard keys to e.g. appear to bounce at the same rate as the device. For example, when traveling on a bumpy road with the device, input from an accelerometer may be used to assist when a user in attempting to type a key on a keyboard. The user may be assisted by e.g. continuing to present other portions of what is presented on the display as being stationary relative to the display while also moving the keys and/or keyboard at the same rate as the movement being detected to thus making it much easier to press the intended key(s), by e.g. making the key or images represented on the key (e.g. the letters) larger when device motion is detected so it is easier to press the intended key, and/or by e.g. configuring the device to receive a longer key press before processing the input to the key to provide an additional safeguard that a selected key is the key intended to be selected while the device is in motion.

Using a similar example, suppose a passenger in a car is typing on a cell phone and the car hits a pothole. The car and phone both move down suddenly. The keyboard may thus appear to move in the opposite direction of the device's movement according to the intensity of the device movement to thus help the user select the intended key(s) (e.g. by keeping a particular key over which the user is hovering under the user's finger). Thus, in some embodiments the keyboard may be configured to e.g. only change configurations in accordance with present principles if the user's finger is detected as hovering over the device, and/or when a text box is active. Otherwise such features may be disabled if desired.

Furthermore, it is to be understood that a device in accordance with present principles may also be configured to detect if the user's arm and/or finger is stabilized on the device itself, and in such instances may modify the amount of "keyboard bouncing" or other keyboard movement on a display of the device. E.g. the keyboard movement may be configurable using automated inputs. Thus, e.g. if the user braces their body over a display of the device for typing in a bumpy environment, the user may need relatively less key movement than if they were not bracing their body for typing. Furthermore, the device may use relatively less and less keyboard movement as more and more of the user's body is detected as being braced. The foregoing examples may be undertaken using e.g. input from the touch-enabled display sensing the proximity of a user and/or e.g. input from a camera for detecting (based on input from the camera) if the user's wrist, finger, arm, elbow, shoulder, etc. is braced to the device and/or (e.g. relatively) stationary above the display of the device to keep the user's movement similar to the device's movement. Moreover, note that e.g. using such techniques the device may determine whether the user is using two hands for such purposes (e.g. holding the device in one hand and providing input with the other) and in such cases may determine to present the keyboard with relatively less movement than when the user is detected as using only one hand (e.g. holding the device in the hand and typing using the thumb of the same hand).

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave.

While the particular ALTERING PRESENTATION OF AN ELEMENT PRESENTED ON A DEVICE BASED ON INPUT FROM A MOTION SENSOR is herein shown and described in detail, it is to be understood that the subject matter which is encompassed by the present application is limited only by the claims.

What is claimed is:

1. A device, comprising:

at least one touch-enabled display;

at least one motion sensor;

at least one processor; and storage accessible to the at least one processor and comprising instructions executable by the at least one processor to:

present, on the touch-enabled display, a keyboard in a first configuration;

receive at least one motion signal from the motion sensor;

at least in part based on the motion signal, identify whether motion of the device is at least as great as a threshold;

responsive to identifying that motion of the device is at least as great as the threshold, present the keyboard in a second configuration different from the first configuration; and subsequent to presentation of the keyboard in the second configuration and responsive to identifying that motion of the device has gone below the threshold, return the keyboard to presentation per the first configuration;

wherein the motion signal contains information that is indicative of movement of the device at least in a first direction of a first dimension and in a second direction of a second dimension, and wherein the instructions are further executable by the at least one processor to:

at least in part in response to receipt of the motion signal, present the keyboard in the second configuration, wherein at least a portion of the keyboard is presented in the second configuration on at least one area of the touch-enabled display on which the keyboard is not presented in the first configuration, the area being in a display direction on the touch-enabled display relative to the first configuration that corresponds to third and fourth directions respectively in the first dimension and second dimension that are respectively opposite the first and second directions.

2. The device of claim 1, wherein the instructions are executable by the at least one processor to:

for presentation of the keyboard in the second configuration, present at least one key of the keyboard in a size larger than the at least one key is presented in the first configuration.

3. The device of claim 1, wherein the instructions are executable the at least one processor to:
for presentation of the keyboard in the second configuration, present at least a portion of the keyboard on at least one area of the touch-enabled display on which the keyboard is not presented in the first configuration.

4. The device of claim 1, wherein the instructions are executable the at least one processor to:
for presentation of the keyboard in the second configuration, require a contact of at least one key in the second configuration to be longer than contact of the at least one key in the first configuration to enter data using the at least one key.

5. The device of claim 1, wherein the instructions are executable by the at least one processor to:
for the second configuration, not present at least a portion of the keyboard on at least one area of the touch-enabled display on which the keyboard is presented in the first configuration.

6. The device of claim 1, wherein the signal is a first signal, wherein the first signal indicates information that is indicative of movement of the device in a first direction, and wherein the instructions are further executable by the at least one processor to:
receive at least a second signal from the motion sensor; and
at least in part in response to receipt of the second signal, present the keyboard in the first configuration;
wherein the second signal contains information that is indicative of movement of the device in a third direction at least substantially opposite the first direction.

7. The device of claim 1, wherein the instructions are executable to:
at least in part in response to receipt of the signal and based on a determination that at least a portion of a user is in proximity to the surface of the touch-enabled display, present the keyboard in the second configuration.

8. The device of claim 1, wherein the instructions are executable by the at least one processor to:
responsive to identifying that motion of the device is not at east as great as the threshold, not change the keyboard from the first configuration.

9. The device of claim 1, wherein the instructions are executable by the at least one processor to:
return the keyboard to presentation per the first configuration even if the device does not return to a location at which the device was disposed while presenting the keyboard in the first configuration prior to identifying that motion of the device is at least as great as the threshold.

10. The device of claim 1, wherein the instructions are executable by the at least one processor to:
present, on the touch-enabled display, a user interface (UI) different from the keyboard, the UI comprising a selector element that is selectable to enable the device to change configurations of the keyboard based on signals from the motion sensor.

* * * * *